Oct. 19, 1971     W. WHITTAKER     3,613,179

CABLE OR ROD ANCHORING MEANS

Filed Aug. 12, 1970     2 Sheets-Sheet 1

Inventor:
William Whittaker
BY Baldwin Wight & Brown
Attorneys

Inventor:
William Whittaker
By Baldwin Wight & Brown
Attorneys

United States Patent Office 3,613,179
Patented Oct. 19, 1971

3,613,179
CABLE OR ROD ANCHORING MEANS
William Whittaker, Leeds, England, assignor to C.C.L.
Systems Limited, Surbiton, Surrey, England
Filed Aug. 12, 1970, Ser. No. 63,202
Claims priority, application Great Britain, Aug. 20, 1969,
41,565/69
Int. Cl. F16g 11/02
U.S. Cl. 24—123 W
18 Claims

ABSTRACT OF THE DISCLOSURE

A clamping and anchoring device for rods and stranded cables comprising a cylindrical or tubular element having bores and hardened inserts to receive and hold the rods or strands, and a clamping and anchoring structure consisting of two or more of said elements which are mounted and clamped one upon the other.

---

This invention relates to compression type clamping and anchoring means for high tensile rods and stranded cables.

More particularly, the invention is concerned with a clamping and anchoring device, and a clamping and anchoring structure using a plurality of said devices.

By "compression type clamping and anchoring means" is meant a multi-apertured cylindrical member of ductile metal arranged to receive a plurality of rods or strands, and to be compressed so as to clamp said rods or strands in said apertures.

According to the present invention, there is provided a clamping and anchoring device for rods or stranded cables, which comprises a cylindrical or tube-like member having a plurality of longitudinally extending bores therethrough or a plurality of longitudinal recesses therein, wherein each bore or recess has received therein a multi-part cylindrical insert which is such as to receive one or more rods or strands, the inserts being internally and externally serrated and being of harder metal than that of the cylindrical or tube-like member.

The term "serrated" is intended to include roughened or knurled, and also screw-threading.

According to the invention furthermore, there is provided a clamping and anchoring structure which comprises a plurality of the devices hereinbefore defined which comprises a plurality of the devices hereinbefore defined which, in use, are mounted and compressed in co-axial relationship with one another.

Figure 1:
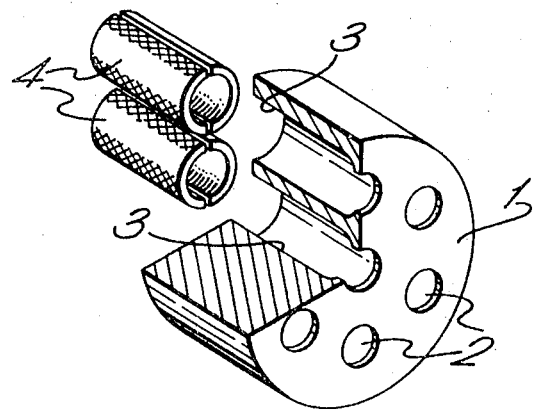
Figure 2:
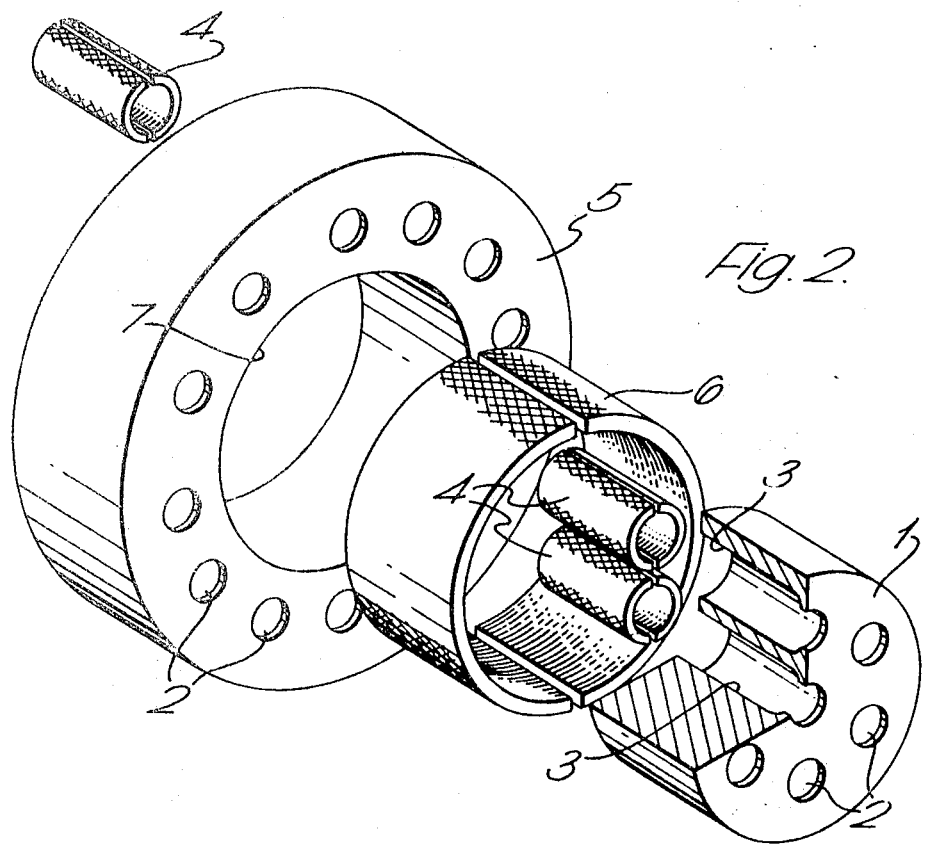
Figure 3:
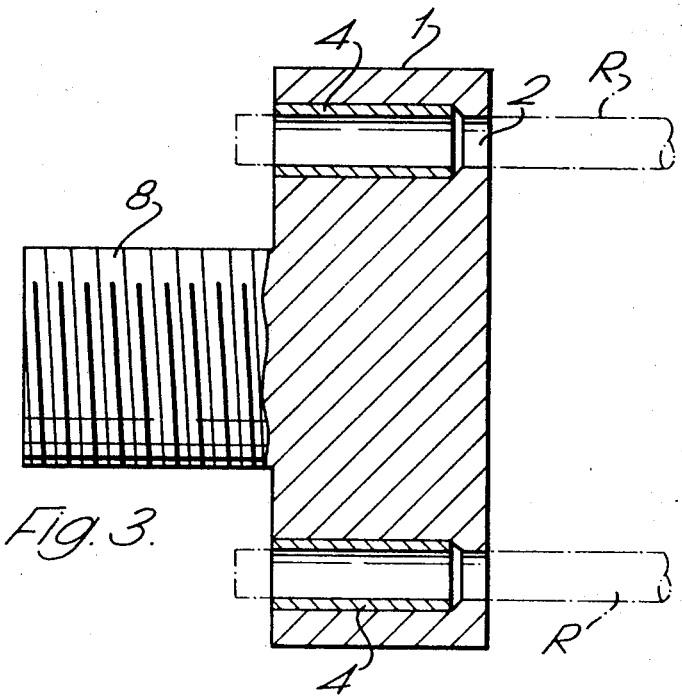
Figure 4:
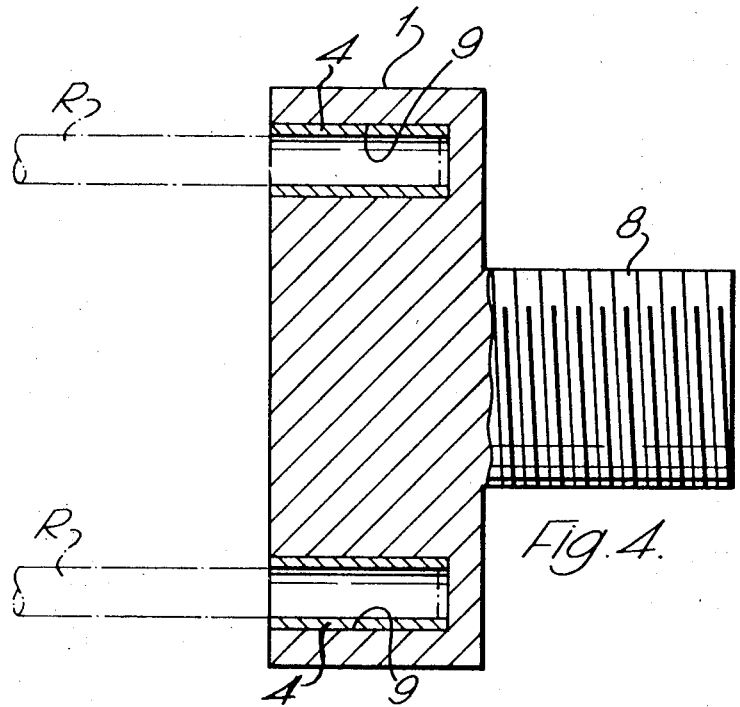

The invention is illustrated by way of example in the accompanying drawings in which, FIG. 1 is an exploded perspective view, partially cut away, of a device according to the invention, FIG. 2 is an exploded perspective view, partially cut away, of a clamping and anchoring structure according to the invention, FIG. 3 is a section through modification of the device of FIG. 1, and FIG. 4 is a section through a further modification of FIG. 1.

Referring to FIG. 1 of the drawings, there is shown a cylindrical element 1 of ductile metal having a plurality of spaced axially disposed bores 2 each adapted to receive a rod or strand R (FIGS. 3 and 4). Over a major part thereof, each bore 2 is of enlarged cross-section as indicated at 3 to receive a two-part circular insert 4.

In use, the rods or strands are positioned in the bores 2 with the inserts 4 positioned in the enlarged bore portions 3, and the element 1 is then compressed, as by swaging or the like, to clamp the rods or strands therein.

Where it is required to anchor a larger number of rods or strands, the device of FIG. 1 is adapted to be used in conjunction with one or more similar devices consisting of an element 5 of annular formation as is shown in FIG. 2. The element 5 is formed with bores 2 and co-acting inserts 4 in the same manner as that of the element 1 of FIG. 1. In this case, a two-part cylindrical insert 6 is adapted to be positioned between the periphery of the element 1 and the periphery of the bore 7 of the element 5.

In use, rods or strands are clamped in the element 1 as hereinbefore described and the element 5, is then positioned over and surrounding the element 1 with the insert 6 interposed between the elements 1 and 5. Additional rods or strands, with the inserts 4, are positioned in the bores 2 of the element 5. The element 5 is then compressed onto the element 1 so that the two elements are in tight engagement with one another, and so that the rods or strands of the element 5 are clamped and held in the latter.

Further elements 5 of increasing diameters can be added to increase the number of rods or strands to be clamped in the structure. In this case, an insert 6 will be positioned between adjacent elements 5.

The anchoring device of FIG. 1, and the anchoring structure of FIG. 2, are particularly suitable for use in forming tendons for reinforcing concrete structures. In this respect, it will be appreciated that the rods or strands are held in a positive and unyielding manner whereby a decrease, or a reversal, in the tensile forces acting on the rods or strands does not affect the position of the anchored ends. This latter feature is particularly important with concrete structures having non-bonded tendons or members where the anchor head permanently resists the full tensile forces applied to the tendon or member.

In the arrangements hereinbefore described, one face of the elements 1 or 5 is adapted to enter into engagement with a bearing or other plate provided at the end of a structure. However, an alternative method of positioning the anchorage is by providing the element 1 with a shank 8, having attaching means, such as screw threads, thereon as shown in FIG. 3, by which the anchorage can be fixed to another element.

A further modification to the anchorages hereinbefore described is shown in FIG. 4. In this case, the element 1, and also of course the element 5, can be formed with recesses 9 which receive inserts 4 but do not extend completely through the thickness of the element. Here again, the element may be provided with a shank 8 instead of being in direct engagement with a bearing or other plate.

The inserts 4 and 6 are of a harder metal than that of the elements 1 and 5 and have a screw-threaded or similarly formed internal surface, and a knurled, serrated or otherwise roughened outer surface whereby, in use, the outer surfaces bite into the softer metal of the elements 1 and 5.

Although the invention has been described with reference to the prestressing of concrete structures, it will be understood that it is not limited in this respect. Thus, it may also be applied to other structures where the rods or strands are used for tensioning or load-carrying purposes, or to ground or rock anchorages or similar structures.

What I claim is:

1. A clamping and anchoring device for rods or stranded cables comprising a compressible element having a plurality of spaced longitudinal bores formed therein, wherein each bore has received therein a multi-part cylindrical insert which is such as to receive one or more rods or strands, the inserts being internally and externally serrated and being of harder metal than that of said element.

2. A device as claimed in claim 1, in which the bores extend the full length of the compressible element.

3. A device as claimed in claim 2, in which a major portion of each bore is of increased cross-section to accommodate its co-acting insert.

4. A device as claimed in claim 1, in which the bores extend only partially through the compressible element and are of a cross-sectional size to accommodate both the rod or strand and the co-acting insert.

5. A device as claimed in claim 1, in which the compressible element is of cylindrical formation, one end thereof being formed with a shank having attaching means thereon.

6. A device as claimed in claim 1, in which the inserts each has a screw-threaded internal surface, and a roughened outer surface.

7. A clamping and anchoring structure comprising at least two of the devices claimed in claim 1, and wherein the compressible element of one of said devices surrounds the compressible element of the other of said devices, a two-part cylindrical insert being interposed between said compressible elements.

8. A device as claimed in claim 2, in which the compressible element is of cylindrical formation, one end thereof being formed with a shank having attaching means thereon.

9. A device as claimed in claim 3, in which the compressible element is of cylindrical formation, one end thereof being formed with a shank having attaching means thereon.

10. A device as claimed in claim 4, in which the compressible element is of cylindrical formation, one end thereof being formed with a shank having attaching means thereon.

11. A device as claimed in claim 2 in which the inserts each has a screw-threaded internal surface and a roughened outer surface.

12. A device as claimed in claim 3 in which the inserts each has a screw-threaded internal surface and a roughened outer surface.

13. A device as claimed in claim 4 in which the inserts each has a screw-threaded internal surface and a roughened outer surface.

14. A device as claimed in claim 5 in which the inserts each has a screw-threaded internal surface and a roughened outer surface.

15. A clamping and anchoring structure comprising at least two of the devices claimed in claim 2, and wherein the compressible element of one of said devices surrounds the compressible element of the other of said devices, a two-part cylindrical insert being interposed between said compressible elements.

16. A clamping and anchoring structure comprising at least two of the devices claimed in claim 3, and wherein the compressible element of one of said devices surrounds the compressible element of the other of said devices, a two-part cylindrical insert being interposed between said compressible elements.

17. A clamping and anchoring structure comprising at least two of the devices claimed in claim 5, and wherein the compressible element of one of said devices surrounds the compressible element of the other of said devices, a two-part cylindrical insert being interposed between said compressible elements.

18. A clamping and anchoring structure comprising at least two of the devices claimed in claim 5, and wherein the compressible element of one of said devices surrounds the compressible element of the other of said devices, a two-part cylindrical insert being interposed between said compressible elements.

References Cited

UNITED STATES PATENTS

| 3,488,903 | 1/1970 | Whittaker | 52—230 |

FOREIGN PATENTS

| 502,865 | 5/1951 | Belgium | 52—230 |
| 1,271,959 | 7/1968 | Germany | 52—230 |

BERNARD A. GELAK, Primary Examiner

U.S. Cl. X.R.
287—20.3; 52—223